A. GABROHN.
HOSE COUPLING.
APPLICATION FILED JUNE 8, 1912.

1,113,770. Patented Oct. 13, 1914.

Witnesses
A. M. Shannon.
Chas. W. Stauffiger.

Inventor
Albert Gabrohn

By
Attorneys

UNITED STATES PATENT OFFICE.

ALBERT GABROHN, OF DETROIT, MICHIGAN.

HOSE-COUPLING.

1,113,770.  Specification of Letters Patent.  Patented Oct. 13, 1914.

Application filed June 8, 1912. Serial No. 702,480.

*To all whom it may concern:*

Be it known that I, ALBERT GABROHN, a citizen of the United States of America, residing at Detroit, in the county of Wayne and State of Michigan, have invented certain new and useful Improvements in Hose-Couplings, of which the following is a specification, reference being had therein to the accompanying drawings.

This invention relates to improvements in hose couplings and more particularly to a coupling for high pressure hose such as is used for conducting air under pressure and its object is to provide a simple device which is so constructed that it will not cut or otherwise injure the hose to which it is attached and will obviate the possibility of leakage.

To this end the invention consists in the matters hereinafter set forth and more particularly pointed out in the claim reference being had to the accompanying drawing in which—

Figure 1:
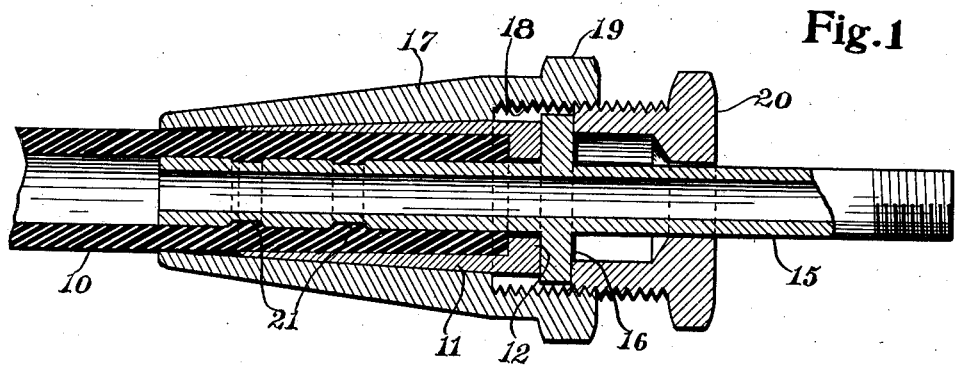
Figure 2:
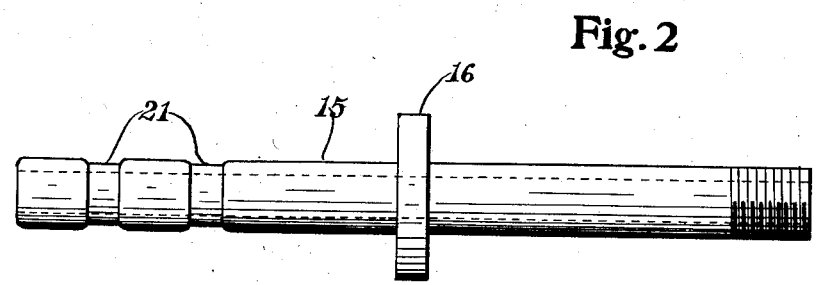
Figure 3:
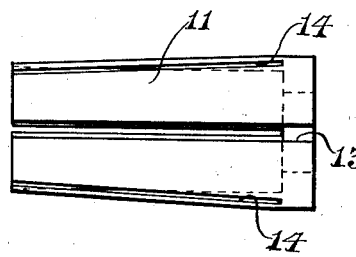
Figure 4:
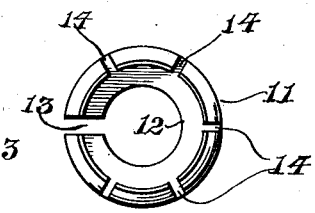

Figure 1 is a longitudinal section through a coupling embodying the invention; Fig. 2 is a side elevation of a coupling tube; Fig. 3 is a side elevation of a split clamping sleeve, and Fig. 4 is an end elevation of Fig. 3.

As shown in the drawing 10 is the end of a flexible hose or tube forming a conduit for air or other fluid under heavy pressure. Upon the end of the hose 10 is slipped a split clamping sleeve 11 having an inwardly projecting flange 12 to engage the end of the hose and formed with a conical outer surface extending from the opposite end of the sleeve. The sleeve is split or severed from end to end at 13 and is also formed with slits or cuts 14 extending from the thin end of the sleeve to the collar 12 which forms a connecting portion holding the parts between the cuts together.

A connecting tube 15 is inserted at one end into the end of the hose and passes loosely through the flange 12 of the split sleeve. This tube is formed intermediate its ends with an integral flange 16 adapted to abut the flanged end of the split sleeve 11 and the outer end of the tube is screwthreaded or otherwise formed for its connection to a coupling nut or any other part to which it is desired to attach the hose.

A coupling sleeve 17 is movable longitudinally of the hose and is formed with a tapering bore to fit the tapered outer surface of the split sleeve 11. The coupling sleeve is also formed with an enlarged and internally screwthreaded bore 18 at one end and this end is also formed with a hexagonal head 19 for the engagement of a wrench. A clamping nut 20 having an external screwthread to engage the internal screwthread of the chamber 18 is provided with an axial bore through which the coupling tube 15 extends and this nut is adapted to engage the flange 16 on the coupling tube at its inner end so that when it is screwed into the chamber 18 the tube together with the split sleeve will be forced longitudinally of the clamping sleeve 17 and by reason of the tapering contact surfaces of the two sleeves, the split sleeve will be contracted upon the end of the hose and firmly clamp the same to the end of the coupling tube which is formed with grooves 21 into which the flexible tube will be pressed to firmly hold the same upon the tube against possible detachment.

In this construction the end of the rubber tube is compressed within the split sleeve which sleeve does not extend the full length of the clamping sleeve 17 so that the hose is relieved slightly at the end of the clamping sleeve so that it will not be pinched at that point and thus cause it to crack and break off. The arrangement of two sliding tapered sleeves forced upon each other by means of the nut gives a very strong clamping effect and all possibility of leakage is obviated. The flange 12 on the split sleeve which engages the end of the hose also assists in making a tight joint and in protecting the hose against injury.

Obviously, changes may be made in the details of construction without departing from the spirit of my invention and I do not wish to limit myself to the particular form and arrangement shown.

Having thus fully described my invention what I claim is:—

In a coupling, the combination with a flexible conduit formed of compressible material, a coupling tube extending into an end of the conduit and having annular grooves formed therein in which the walls of said conduit engage, a split sleeve on the conduit having an inwardly extending flange engaging the end of the conduit and formed with an outer surface which is tapered inward from the flanged end to the opposite end of the sleeve, said sleeve having slitted portions between the split edges thereof, a clamping sleeve arranged upon the split sleeve and adapted to depress the slitted portions of said sleeve and having an internal tapering bore to engage the tapered surface of the split sleeve and formed with an internally screw threaded bore at one end adjacent to the flanged end of the split sleeve, a peripheral flange on the coupling tube and against which the flanged end of the split sleeve abuts, and an externally threaded nut surrounding said coupling tube and engaging the flange thereof and entering said clamping sleeve to move said sleeve longitudinally of said split and slitted sleeve.

In testimony whereof I affix my signature in presence of two witnesses.

ALBERT GABROHN.

Witnesses:
ANNA M. DORR,
LEWIS E. FLANDERS.